(12) United States Patent
Bohler

(10) Patent No.: US 6,913,268 B2
(45) Date of Patent: Jul. 5, 2005

(54) ROTATION-INDEPENDENT ACTUATION OF A MACHINE ELEMENT

(75) Inventor: Erwin Bohler, Schweiz (CH)

(73) Assignee: Forkardt Schweiz AG, Effretiken (CH)

( * ) Notice: Subject to any disclaimer, the term of this patent is extended or adjusted under 35 U.S.C. 154(b) by 167 days.

(21) Appl. No.: 10/239,546

(22) PCT Filed: Mar. 2, 2001

(86) PCT No.: PCT/IB01/00312

§ 371 (c)(1),
(2), (4) Date: Jan. 27, 2003

(87) PCT Pub. No.: WO01/70439

PCT Pub. Date: Sep. 27, 2001

(65) Prior Publication Data

US 2004/0025683 A1 Feb. 12, 2004

(30) Foreign Application Priority Data

Mar. 23, 2000 (EP) .............................. 00105927

(51) Int. Cl.$^7$ .............................................. B23B 31/30
(52) U.S. Cl. ...................... 279/4.1; 279/4.12; 384/100; 92/106
(58) Field of Search ........................... 92/106; 137/580; 279/4.1, 4.11, 4.12, 134; 285/33, 34, 306; 384/100; 409/233

(56) References Cited

U.S. PATENT DOCUMENTS

| 2,652,913 | A | * | 9/1953 | Schou | 192/87.11 |
|---|---|---|---|---|---|
| 3,417,672 | A | | 12/1968 | Sampson | |
| 3,855,902 | A | * | 12/1974 | Kirst | 92/106 |
| 4,349,207 | A | * | 9/1982 | Fink | 279/4.12 |
| 4,478,247 | A | * | 10/1984 | Alber | 137/580 |
| 4,482,162 | A | * | 11/1984 | Anegawa | 279/4.12 |
| 4,493,242 | A | * | 1/1985 | Rohm | 91/1 |
| 4,537,410 | A | * | 8/1985 | Hiestand | 279/4.01 |
| 5,226,869 | A | * | 7/1993 | Thumm | 483/1 |
| 5,549,427 | A | * | 8/1996 | Hiestand | 409/233 |
| 5,707,186 | A | * | 1/1998 | Gobell et al. | 409/233 |
| 6,038,948 | A | * | 3/2000 | Link et al. | 82/147 |

FOREIGN PATENT DOCUMENTS

| DE | 39 25 880 A1 | 6/1991 |
|---|---|---|
| GB | 513390 | 11/1939 |
| GB | 629229 | 7/1949 |

* cited by examiner

Primary Examiner—Derris H. Banks
Assistant Examiner—Michael W. Talbot
(74) Attorney, Agent, or Firm—Olson & Hierl, Ltd.

(57) ABSTRACT

The invention relates to rotating machine element that contains a mechanism actuated by a fluid pressure. The aim of the invention is to allow for a supply of actuation fluid also during the rotation. To this end, a non-rotating control element (2) is mounted on two fluid bearings (3) on the machine element, said bearings being spaced apart in the axial direction and allowing flows of actuation fluid to flow from one element to the other. Feed lines (R, S) in the control element are provided with a series of radially inwards facing ports (13, 14) and reception channels (17, 18) in the machine element, a series of radially outward facing orifices (15, 16) being disposed in such a manner that in every relative position both elements for every individual flow of actuation fluid are disposed such that at least one port (13, 14) is aligned with one associated orifice (15, 16).

14 Claims, 2 Drawing Sheets

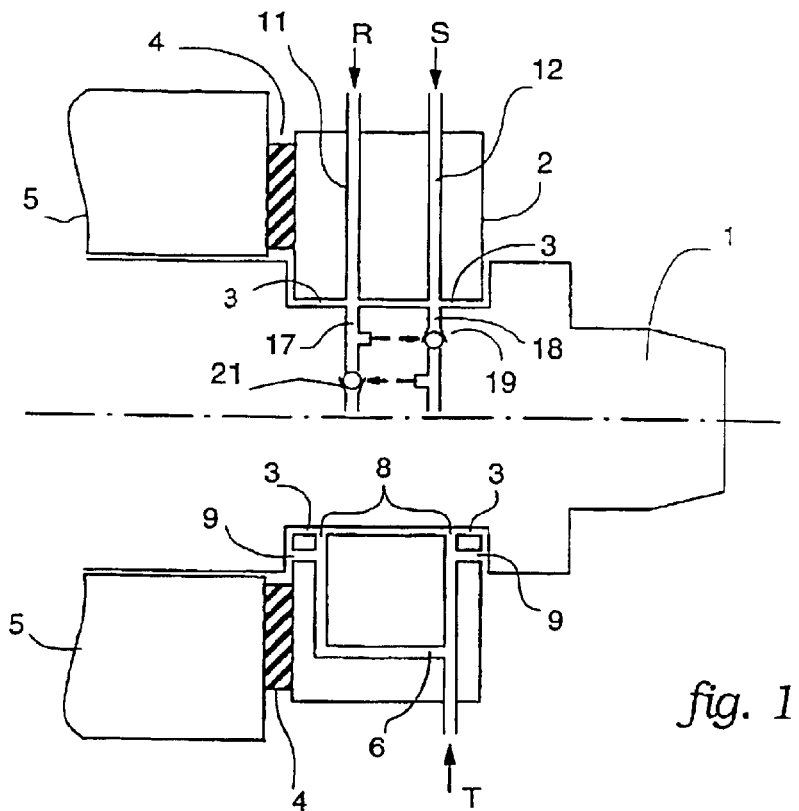
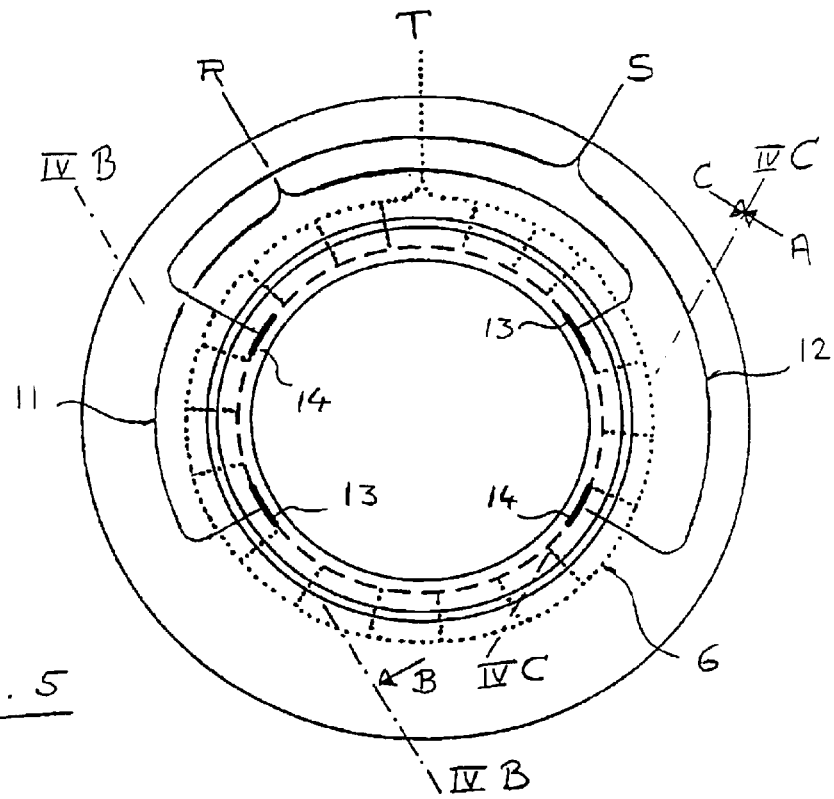
fig. 1
Fig. 5

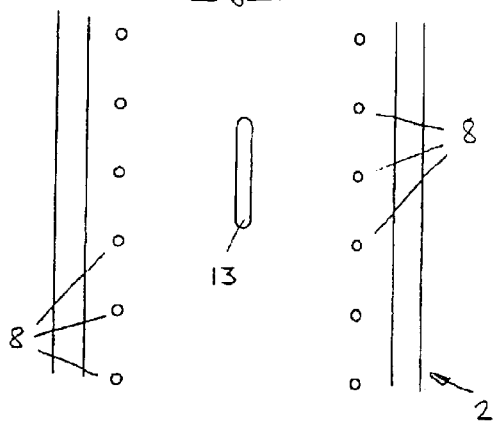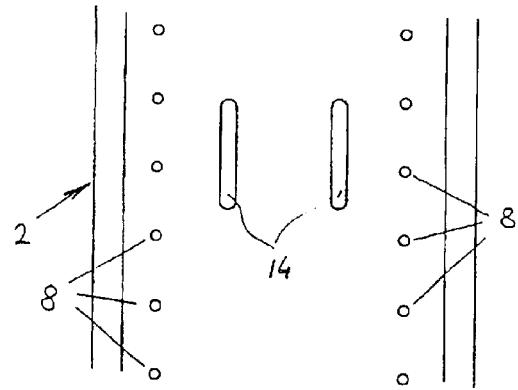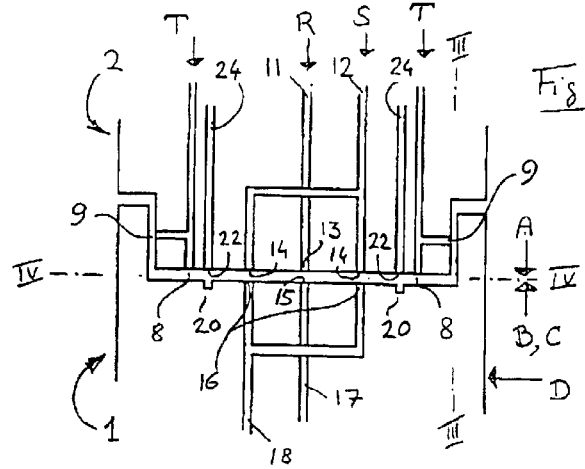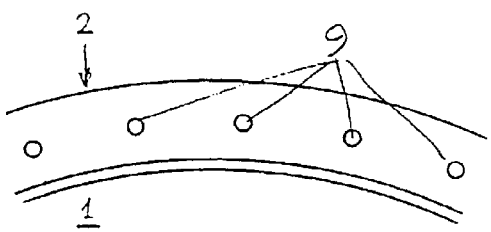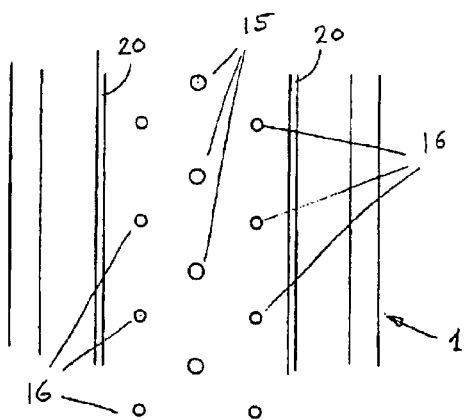

ROTATION-INDEPENDENT ACTUATION OF A MACHINE ELEMENT

CROSS-REFERENCE TO RELATED APPLICATIONS

This application claims the priority of the European Patent application 00 105 927.8, which was filed Mar. 23, 2000 and the whole content of which is incorporated herein by reference.

BACKGROUND OF THE INVENTION

The invention relates to a method and a device for operating a rotating machine part which can be actuated by a fluid, for instance the so called front-end chuck of a machine tool. It is known to actuate the opening and/or closing of a chuck—both of which will hereafter be called "operating it"—by pneumatic or hydraulic means, which is particularly advantageous for serially machining workpieces. Because of the required and ever increasing machining speed, it is desirable to be able to command the operation of the chuck not only when it is at rest, but also when its rotation has already begun or not yet stopped.

STATE OF THE ART

However, the known pneumatically activated chucks can only be operated when they are at rest, because the diaphragm seals used at the interface between the immobile channels delivering compressed air and the channels in the rotating chuck only allow a noticeable increase of air pressure in the chuck without a great pressure loss when the chuck is at rest. Indeed, if the channels are pressurized when the chuck rotates, this pressure generates an undue friction and a corresponding wear of the seals. It is moreover impossible to avoid an undesirable soiling of the gaskets, which in turn deteriorates the air tightness of the seals. Further, devices are known where an air delivery ring surrounds the chuck on which it is journalled by ball bearings; the transmission of compressed air then occurs across a cylindrical slit which separates the ring from the chuck. However, this arrangement is only feasible for small diameters of the slit because otherwise an excessive pressure loss occurs, and the chuck cannot be operated anymore. Also, when the chuck is large this arrangement requires a ball bearing with a huge diameter, which brings its own problems, among others because such ball bearings overheat at high rotational speed. Even in normal use the known solutions can be dangerous when a pressure loss occurs because of a imperfect sealing between the stationary ring and the rotating chuck. Therefore, in order to maintain the necessary pressure—e.g. for keeping the chuck closed the channel in the chuck must be sealed by a return valve. The safety of the machine, for instance with regard to an unintentional opening of the check when machining a workpiece, then rests entirely on the faultless functioning of the return valve, and this also represents a potential danger. Finally, the diaphragm of gasket rings inserted between the rotating and the immobile sections of the channels are prone to become soiled, which is particularly detrimental on a machine tool.

BRIEF SUMMARY OF THE INVENTION

The invention is defined as recited in the main claim. This avoids the above drawbacks and brings some additional advantages such as the lack of friction between the chuck and the ring. Thus, neither heat nor wear occur at their interface. Further, the air gap can be made very narrow, which entails a correspondingly small loss of pressure. Due to the narrowness of the air gap, and because of the directed currents therein, dirt can practically not enter the command circuit, which again reduces the wear and is important both for the reliability and for the precision of the machine.

SHORT DESCRIPTION OF THE DRAWINGS

The invention will now be explained in more detail through the description of an embodiment and with the help of the drawing all figures of which are only schematic in order to facilitate the comprehension. In particular the figures are not to scale, because, amongst others, the clearance of the journals has been exaggerated for better clarity.

FIG. 1 shows a simplified section through an embodiment of the invention, and is only meant to give a general overview.

FIG. 2 schematically shows the general outlay of the channels in the command ring and in the rotor near the fluid bearing. For simplicity several axial plans were flapped into a single one.

FIG. 3 is a partial schematical view of a section along III—III of FIG. 2;

FIG. 4A shows a view radially inwards, in the direction of arrow A, at the section IV—IV of FIG. 2;

FIGS. 4B and 4C schematically show views directed radially outwards in the direction of the arrows B and C at the section IV—IV of FIGS. 2 and 5, in two positions which differ by a certain angle;

FIG. 5 is a basis diagram of the fluid channels, viewed in direction of the arrow D of FIG. 2.

DETAILED DESCRIPTION OF THE INVENTION

In order to illustrate the principle of the invention FIG. 1 shows a very schematic section through an embodiment of said invention. Note that the sections shown on either side of the axis are rotated by a certain angle. Reference number 1 designates the pneumatically operated chuck of a machine tool (not shown). A command ring 2 is carried by the body of the chuck and separated from it by two fluid bearings 3. The command ring 2 is attached to an immobile part 5 of the machine tool by means of an elastic holder 4 in a way which permits restricted movements of the ring without however letting it rotate with the chuck 1. A metallic fixation can also be used for the purpose, provided it is built so as to allow the backlash needed in order to avoid a mechanical overdetermination. The compressed air, which will be called "carrier air" hereafter, necessary for operating the fluid bearing 3 enters the channel 6 at the point T, and is then distributed by this channel around the whole periphery of the command ring 2 (as shown by the dotted lines in FIG. 5). These channels end in a first set of radially inwards oriented outlets 8 which are distributed at equal angular spacings near the rims of the inner bearing surface of the command ring 2 (see also FIGS. 4B and 4C), and in a second set of outlets 9 which are directed in axially opposed directions and distributed at equal angular spacings along the lateral bearing surfaces of the command ring 2 (see also FIG. 3). The air which flows through the first set of outlets 8 builds up the air cushion which acts as a bearing and supports the ring, whilst the air which flows through the second, lateral set of outlets 9 generates an air cushion which withstands axial forces.

In the command ring 2 there are further provided command conduits 11 and 12 for the delivery of actuating air which serves to open, respectively to close, the chuck 1. The arrows R and S indicate the entrance points of compressed air for opening or closing the chuck, respectively. The conduit 11 ends in two slit-shaped orifices 13 placed at 180° interval in the middle of the bearing surface of the command ring 2 (FIGS. 4B and 5). The position of these slits is indicated in FIG. 5 by thickened lines. In order to receive the actuating air which flows through the slits 13, the outer bearing surface of the chuck 1 has in its middle a set of input mouths 15 evenly distributed over its periphery (as shown in FIG. 4A) which are entries into command channels 17 in the chuck 1. These channels all lead to a single pneumatic mechanism (not shown) which serves to open the chuck. The distance between two neighboring input mouths is slightly smaller than the length of the slit 13, so that independently of the mutual position of command ring and chuck the slit 13 always faces at least one input mouth 15. This ensures a flow connection between the command conduit 11 which serves to open the chuck and a mechanism located in the chuck 1 which serves to open the chuck. The thickness of the pneumatic cushion can be made small enough to ensure that only a small pressure lost occurs on the passage from the slit 13 to one or several input mouths 15.

The command conduit 12 in the command ring 2 which serve to close chuck ends in two pairs of slit-like mouths 14 separated by 180°, the slits of each pair being symmetrical with respect to the center of the bearing surface of the command ring 2 (FIGS. 4C and 5). FIG. 5 shows the path of the conduits 11 and 12, and highlights the position of their slit-like orifices 13 and 14 through the use of thickened lines. In order to receive the actuating air which flows from the slits 14 the outer bearing surface of the chuck body 1 has two parallel rows of mouths 16 evenly distributed along the periphery of the bearing; these are entries for the command channels 18 in the chuck body 1 (FIG. 4A). These channels lead to a single pneumatic mechanism (not shown) for closing the chuck. As sketched in FIG. 1, a return valve 19 can be placed in the common part of the command channels 18 in order to maintain the chuck closed even if an unintentional loss of pressure occurs in the conduit 12. This return valve is commanded by a device which forcibly opens it when there is enough pressure in channel 17, so that the chuck can then be opened. In a symmetrical way a return valve 21 is provided in channel 17 and can be opened by a sufficient pressure in channel 18. The distance between two neighboring mouths 16 is slightly smaller than the length of the slits 14, in order to ensure a flow connection between the command conduits 12 of the ring and the command channels 18 of the chuck body in all relative angular positions of the chuck with respect to the command ring. The chuck can thus be operated independently of whether it rotates or not.

In order to improve the separation between the pneumatic journalling near the rims of the bearing and the flow of actuating air which traverse the bearing in its central part, a peripheral groove 20 is provided on the outside of each row of mouths 16. Facing these grooves there are provided radially oriented venting openings 22 in the command ring, which openings lead to venting channels 24. These channels serve mainly to remove superfluous carrier air and can discharge at their other extremity into the atmosphere.

Although the chuck of the embodiment described here is operated pneumatically and the command ring supported on an fluid bearing, the invention works similarly for hydraulically operated machine parts and a command ring supported on an oil sheet. Further, it is expressly noted that the invention is not restricted to the type of embodiment shown here, but defined by the following claims.

What is claimed is:

1. Actuating device for at least one fluid-operated mechanism located in a rotary part of a machine, with a non-rotating command ring journalled on said rotary machine part and comprising at least one delivery channel for providing an actuating fluid to at least one corresponding receiving channel located in the rotary machine part and leading to the mechanism, wherein that at least one outer bearing surface belonging to the command ring is journalled through the carrier fluid of a fluid bearing on at least one inner bearing surface belonging to the machine part, and in that the stream of actuating fluid flowing between the delivery and the receiving channel traverses an annular gap maintained by the carrier fluid between the machine part and the command ring characterized in that at least one delivery channel has several delivery orifices separated by a certain angle around the axis of the fluid bearing.

2. Actuating device according to claim 1, characterized in that the command ring comprises at least one feeder channel for feeding carrier fluid to the fluid bearing, which feeder channel ends in at least two peripheral rows of outlets arranged on the outer surface of the fluid bearing.

3. Actuating device according to claim 2, characterized in that the feeder channel ends in at least two peripheral rows of outlets, where the vectors of the flow at the outlets of both rows have different components in the axial direction of the fluid bearing.

4. Actuating device according to claim 3, characterized in that the feeder channel ends in a pair of rows with inwardly oriented outlets, and in a pair of rows where paired outlets are oriented in axially opposed directions.

5. Actuating device according to claim 1, characterized in that the command ring comprises at least two delivery channels, where the first one has two pairs of delivery orifices shifted by 180° and mutually offset in axial direction of the fluid bearing, whilst the second has orifices which are also shifted by 180° and which are axially positioned between the mutually offset orifices of the first delivery channel and angularly shifted by a certain amount with respect to these.

6. Actuating device according to claim 1, characterized in that at least one delivery channel ends in delivery orifices which positioned in axial direction of the fluid bearing between the two peripheral rows of outlets.

7. Actuating device according to claim 1, characterized in that the rotary machine part comprises at least one receiving conduit for transmitting the pressure of the actuating fluid to the mechanism that must be operated, and in that the receiving conduit has a row of peripheral receiving mouths, at least one of which is aligned in all positions of the rotary machine part with at least one delivery orifice of a corresponding delivery channel.

8. Actuating device according to claim 7, characterized in that the receiving mouths of a receiving conduit are separated by equal angular distances and at that at least one delivery orifice of the corresponding delivery channel is shaped as an elongated slit the length of which is at least equal to the distance between two successive receiving mouths plus the smallest transversal extent of a receiving mouth.

9. Actuating device according to any of claims 6 to 8, characterized in that when viewed in axial direction of the fluid bearing there is provided between a peripheral row of outlets and a delivery orifice at least one peripheral groove in the inner bearing surface, which groove is aligned with at least one mouth of at least one venting duct provided in the command ring and leading into the open atmosphere.

10. Actuating device according to claim 1, characterized in that the rotary machine part comprises at least two receiving conduits with return valves near their input ends, where the return valve of each receiving conduit is forcibly opened when the pressure in one other exceeds a certain value.

11. Actuating device according to claim 1, characterized in that the machine part is a front-end chuck, and the mechanism a device a pneumatically operated device for opening and closing said chuck.

12. Actuating device according to claim 1, characterized in that the command ring comprises several delivery channels for the actuating fluid, wherein the delivery orifices of the different channels in an axial direction of the fluid bearing are shifted with respect to one another.

13. Method for operating a mechanism located in a rotary machine part and actuated by fluid pressure, characterized in that two fluid bearings separate a non-rotating command device from the rotary machine part, and that a stream of actuating fluid crosses from one to the other between said two fluid bearings, characterized in that the crossing occurs between several radial orifices of delivery channels located in the command device and a row of radially oriented mouths of receiving conduits provided in the machine part, which are arranged such that whatever the relative position of the machine part and the command device, at least one orifice of each delivery channel overlaps at least partially with at least one mouth of a corresponding receiving conduit.

14. Method according to claim 13, characterized in that the leakage of carrier fluid from the fluid bearings due to the pressure in the fluid bearings is used as a means for counteracting the inflow of dirt into the fluid bearings and the contamination of the actuating fluid with dirt.

* * * * *